(12) United States Patent
Krym et al.

(10) Patent No.: US 8,385,197 B2
(45) Date of Patent: Feb. 26, 2013

(54) PRACTICAL MEASUREMENT-BASED SESSION ADMISSION CONTROL FOR WI-FI LAN SYSTEMS

(75) Inventors: Marvin Krym, Nepean (CA); Jozef Babiarz, Kanata (CA); Lambertus Verberk, Woodlawn (CA); Xiao-Gao Liu, Kanata (CA); Tarak Shingne, Ottawa (CA)

(73) Assignee: Avaya Inc., Basking Ridge, NJ (US)

( * ) Notice: Subject to any disclaimer, the term of this patent is extended or adjusted under 35 U.S.C. 154(b) by 334 days.

(21) Appl. No.: 12/716,168

(22) Filed: Mar. 2, 2010
(Under 37 CFR 1.47)

(65) Prior Publication Data
US 2011/0058473 A1 Mar. 10, 2011

Related U.S. Application Data

(60) Provisional application No. 61/156,982, filed on Mar. 3, 2009.

(51) Int. Cl.
*H04J 1/16* (2006.01)

(52) U.S. Cl. ........................ 370/230; 370/349

(58) Field of Classification Search .................. 370/230, 370/230.1, 231, 233, 235, 349, 329, 341
See application file for complete search history.

(56) References Cited

U.S. PATENT DOCUMENTS

| | | | |
|---|---|---|---|
| 6,522,881 B1* | 2/2003 | Feder et al. | 455/437 |
| 7,042,988 B2* | 5/2006 | Juitt et al. | 379/88.17 |
| 7,113,497 B2 | 9/2006 | Cromer et al. | |
| 7,177,649 B1* | 2/2007 | Nielsen | 455/453 |
| 7,203,183 B2 | 4/2007 | Cromer et al. | |
| 7,577,453 B2 | 8/2009 | Matta | |
| 7,822,064 B2* | 10/2010 | Thubert et al. | 370/468 |
| 2006/0056348 A1 | 3/2006 | Marinier et al. | |
| 2006/0142021 A1* | 6/2006 | Mueckenheim et al. | 455/453 |

* cited by examiner

*Primary Examiner* — Brenda H Pham
(74) *Attorney, Agent, or Firm* — Sheridan Ross P.C.

(57) ABSTRACT

A communication system is provided that can control which communication sessions with mobile devices are admitted to a wireless access point. The admission decisions are based on actual measurements of radio frequency (RF) utilization. The RF utilization is determined on a per access class basis. Access classes may be defined by protocol but are, generally, voice, video and data. Thus, the system provides the ability to determine admissions that allows for the incorporation of factors including collisions, the distance from the access point to which a mobile device is communicating, and other factors.

14 Claims, 9 Drawing Sheets

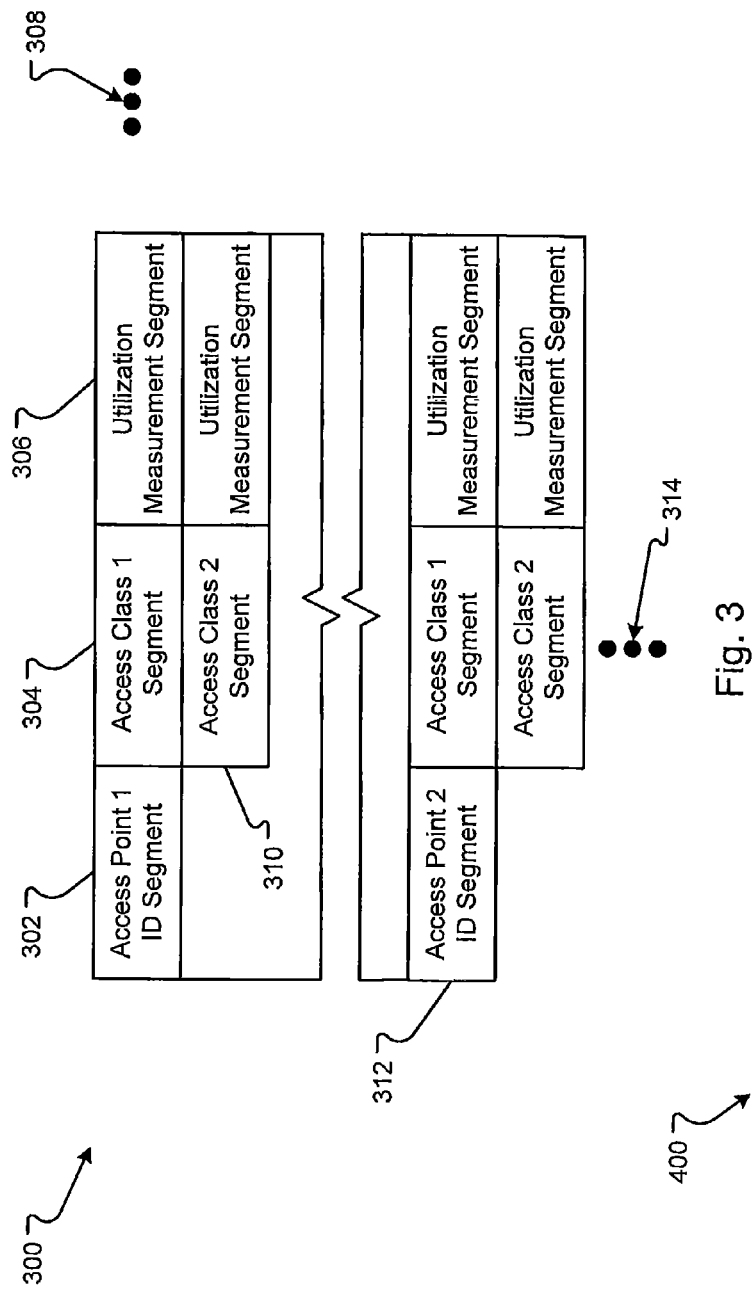

PRACTICAL MEASUREMENT-BASED SESSION ADMISSION CONTROL FOR WI-FI LAN SYSTEMS

CROSS REFERENCE

This application claims priority to U.S. Provisional Application Ser. No. 61/156,982, filed Mar. 3, 2009, entitled "A Practical Measurement-Based Session Admission Control for Wi-Fi LAN Systems," which is incorporated herein by reference in its entirety, and is related to U.S. application Ser. No. 12/716,180, filed Mar. 2, 2010, entitled "Proactive Load Distribution For 802.11l-Based Wireless LANs," which is incorporated herein by reference in its entirety.

BACKGROUND

Improving the quality of service for Voice over Internet Protocol (VoIP) over wireless Local Area Networks (LANs) is critical to achieving the vision of the unwired enterprise. Achieving high quality VoIP poses several challenges, particularly in heavily loaded systems. Voice traffic generally requires higher levels of link performance (i.e. lower delay, jitter, and frame loss) than data because voice sessions must occur in real time and transmitted frames must be received with only a small tolerance in timing or loss. Achieving high voice quality in wireless environments becomes even more challenging due to the possibility of higher noise levels and the varying signal strengths due to barriers and varying distances to the access point (AP). Changing signal strength may increase bandwidth requirements and hence affect voice quality if the bandwidth is not available.

As a calling party or mobile user moves relative to an access point, the RF bandwidth requirements may change (increase or decrease) drastically, depending on the change in distance. Since this change is not accounted for by traditional call admission control algorithms, resource overload can result. Counting sessions as they arrive, for instance, and denying calls beyond a specific number requires over-engineering to account for bandwidth variability. RF-based connections, unlike wired connections, are subject to much more interference (i.e., other radios, noise sources, etc.), which can affect RF bandwidth requirements for the session. RF bandwidth is partitioned across different traffic classes, voice, video, and data, which may result in unused RF bandwidth, if not needed by one of the traffic classes. As callers move from one access point zone to the next access point zone, the likelihood of the adjacent access point taking over the call must remain high (almost independent of call volume) to prevent unexpected disconnections.

SUMMARY

It is with respect to the above issues and other problems that the embodiments presented herein were contemplated. Embodiments of systems and methods provide a system that is able to control which communication sessions with mobile devices are admitted to an access point. The admission decisions are based on actual measurements of radio frequency (RF) utilization. The RF utilization is determined on a per access class basis. Access classes may be defined by protocol but are, generally, voice, video and data. Thus, the system provides an actual ability to determine admissions that allows for the incorporation of factors including collisions, the distance from the access point to which a mobile device is communicating, and other factors. In this configuration, the system prohibits voice and video calls from operating in the collision region to maintain an adequate QoS. Data sessions can operate in the non-collision or collision regions and are not admission-controlled.

The embodiments presented can use a combination of factors (i.e., RF bandwidth utilization, RF bandwidth utilization by traffic class (e.g., voice or video), the radio interference transmission rate for each terminal, the extent of co-channel interference or noise present on the RF channel, and the received signal strength, which varies with distance to the access point and the physical barriers in the transmission path), which are direct resource usage measures to identify a target access point. The product of these measurements, in one configuration, is calculated for use in call admission control and/or load balancing. Measuring RF utilization in the non-collision region can be simple because the RF utilization is normally a linear function of the frame transmission time, which is measured easily on a traffic class basis. Measurements of RF utilization may be made on a per access/traffic class basis. Generally, the 802.11 access/traffic categories or classes are defined as voice, video, best effort, and background. There is no rule or requirement that actual voice data use the voice access category. These are the most important and the most direct factors in determining the best and most available access point. The weight assigned to each factor depends on load. At low loads, signal strength is favored to RF efficiency. In contrast, at high, loads, RF utilization is favored to maximize carried load. This measure can account for the variable environmental factors inherent in wireless systems.

The technique described in this patent is predicated on the fact that voice and video calls must not operate in the collision region to maintain adequate quality of signal (QoS). (As the traffic load increases, beyond a specific point, the collision probability increases sharply. At this and higher loads the system is deemed to be in the collision region.) However, data sessions may operate in either the non-collision or collision region but they are not admission controlled. A technique to avoid over-acceptance during periods of high call request rates, full bandwidth is assumed to be used immediately upon call acceptance. Over time, the calculated bandwidth usage decays to the measured bandwidth usage according to a configurable time constant. Similarly, if the measurement system detects a sharp increase in bandwidth usage due to some type of interference (i.e., a physical barrier or noise), then the system ensures that new admission decisions are made based on the updated usage.

In one configuration, call admission is effected by comparing estimated RF utilization, which includes the new call request, to the bandwidth allocated to the traffic class. When there is adequate bandwidth available, the decision is made to admit the call. When there is inadequate bandwidth, the algorithm allows borrowing of bandwidth from other traffic classes up to a specified limit. This procedure can provide near maximum system level bandwidth utilization. Borrowing bandwidth from different traffic classes has another benefit. When an RF event results in over-bandwidth usage for a traffic class, then, temporarily, traffic classes can borrow from each other until a proper usage is restored. For example, when an RF event results in voice bandwidth usage doubling, then voice calls can use video or data bandwidth. As users end their calls, bandwidth usage will naturally decay and new admissions will be based on the new level of bandwidth available. This procedure ensures graceful readjustment during unexpected RF events (e.g., interference, barriers, etc.) without dropping sessions. In particular, sharing bandwidth with the data traffic class is readily permitted because it is usually the largest allocation and because the Transmission Control Protocol (TCP) most easily adjusts to changes in bandwidth.

Dedicated bandwidth allocations are made for mobility traffic and emergency calls to substantially maximize their success probability.

Voice, video and data receive priority service order based an 802.11 techniques. The utilization for a call admission control (CAC) stream (voice and video only) is measured by determining over-the-air utilization. Over-the-air utilization can be determined by measuring RF utilization. An embodiment of measuring RF utilization determines the frame size of each frame and the physical layer transmission rate (PHY) to determine the frame transmission time. The overhead is added to give the total frame air time. A running sum of air time for each access category (i.e. traffic class or access class) is maintained and refreshed on a periodic basis. The ratio of the total air time to elapsed time provides a good estimate of the RF utilization. Secondary detection/protection mechanisms are also applied to ensure voice and video cannot operate with a load in the collision region. Measurements ensure that bandwidth variability due user-to-AP distance, unexpected barriers in the path, and some types of RF interference are accounted for. The factors may lead to changes in bandwidth usage up to 100%.

When a mobile device makes a request for bandwidth, the CAC mechanism must determine if adequate RF resources are available. It effectively adds the request to the measured bandwidth and determines if the sum is below the allocation (as noted earlier, the allocation must be within the non-collision region). Since there is a significant delay between acceptance of a new call and the time the media starts to flow, a mechanism is needed to prevent over-acceptance during periods when request rates are high. This preventative measure is accomplished by assuming full bandwidth is used immediately upon call acceptance. Over time, the calculated bandwidth usage decays to the measured bandwidth usage according to a configurable time constant. Similarly, if the measurement system detects a sharp increase in bandwidth usage due to some type of interference (i.e. physical barrier or noise) then the system ensures that new admission decisions are made based on the updated usage.

The algorithm compares the estimated RF utilization, which includes the new call request, to the bandwidth allocated to the access class. If there is adequate bandwidth available, then the decision is made to admit the call. If there is inadequate bandwidth, then the algorithm allows borrowing of bandwidth from other access classes up to a specified limit. Borrowing ensures maximum system level bandwidth utilization.

Further, if an RF event results in over-bandwidth usage for an access class then, temporarily, access classes can borrow from each other until a proper usage is restored. For example, if an RF event results in a voice bandwidth usage doubling, then voice calls can use video or data bandwidth. As users end their calls, bandwidth usage will naturally decay, and new admissions can be based on the new level of bandwidth available: This technique ensures graceful readjustment during unexpected RF events (interferences, barriers, etc.) without dropping communication sessions. (Generally, the system allows borrowing of bandwidth from the data access class, temporarily, because data bandwidth is usually the largest allocation and because transmission control protocol (TCP) most easily adjusts to changes in bandwidth. Finally, dedicated bandwidth allocations are made for mobility traffic and emergency calls.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, and volatile media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the computer systems are considered to include a tangible storage medium and prior art-recognized equivalents and successor media, in which the software implementations of the present embodiments are stored.

The terms "determine", "calculate", and "compute," and variations thereof, as used herein, are used interchangeably and include any type of methodology, process, mathematical operation, or technique.

The term "module" as used herein refers to any known or later developed hardware, software, firmware, artificial intelligence, fuzzy logic, or combination of hardware and software that is capable of performing the functionality associated with that element. Also, while the systems and methods are described in terms of exemplary embodiments, it should be appreciated that individual aspects of the embodiments can be separately claimed.

The term "collision" means the result of two or more devices attempting to wirelessly transmit signals at the same time on the same RF channel causing interference with the transmissions where the transmissions can become garbled.

The term "collision region" means the access point bandwidth utilized above a certain point in which more transmissions will cause collisions.

BRIEF DESCRIPTION OF THE DRAWINGS

The present disclosure is described in conjunction with the appended figures:

FIG. 3 is a block diagram of an embodiment of a utilization data structure;

FIG. 4 is a block diagram of an embodiment of a new admission data structure;

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It should be understood that various changes may be made in the function and arrangement of elements without departing from the spirit and scope of the appended claims.

Figure 1:
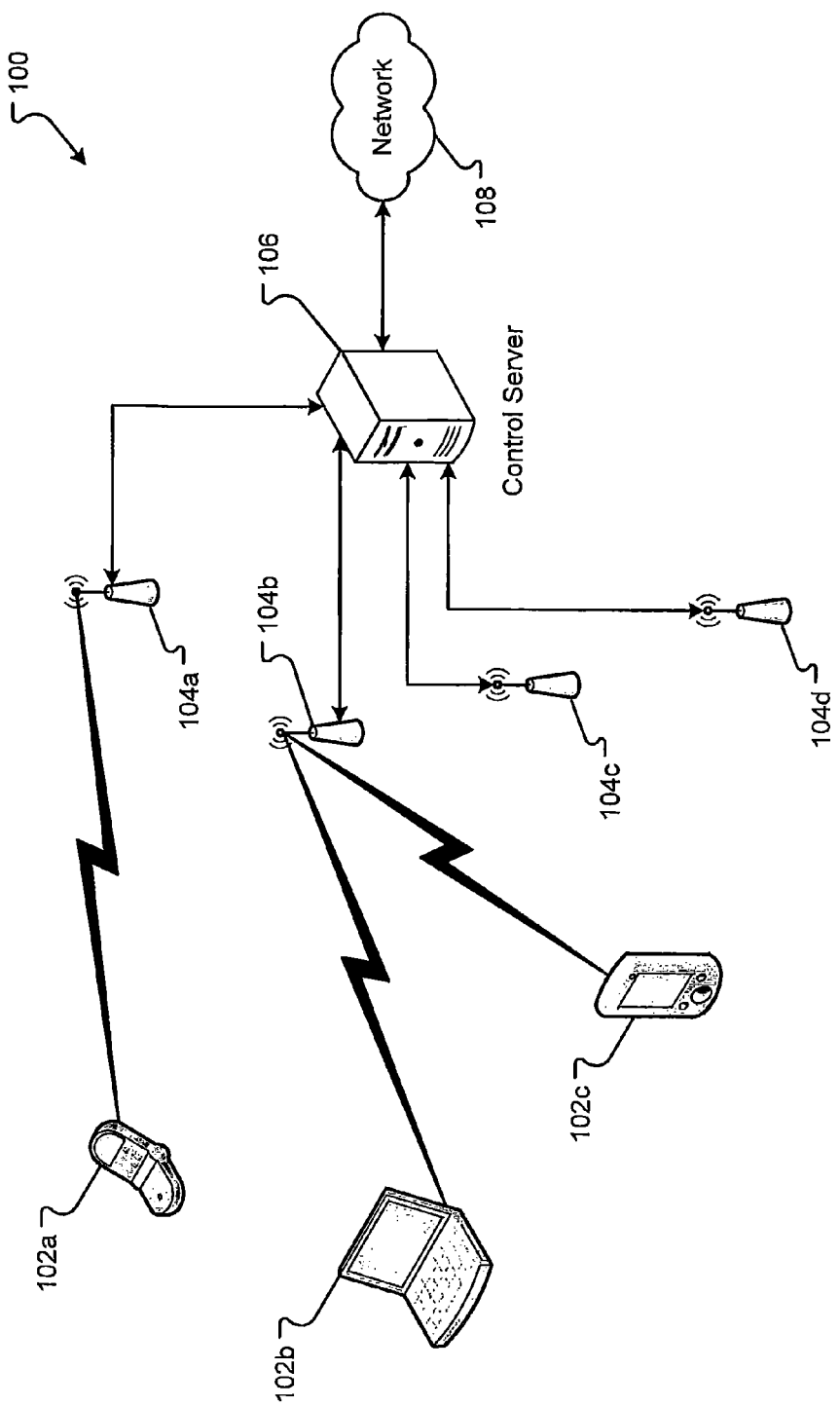
FIG. 1 is a block diagram of an embodiment of a communication system operable to determine the admission of a communication session with an access point.

A communication system 100 for determining the admission of a communication session to an access point 104 is shown in FIG. 1. Communication system 100 can include at least one mobile device 102a, 102b and/or 102c, at least one wireless access point 104a, 104b, 104c, and/or 104d, and at least one control server 106. The communication system 100 can have more or fewer mobile devices 102, access points 104, or control servers 106 than those shown in FIG. 1. The communication system 100 of FIG. 1 is provided only as an example to help describe the functions of the system.

A mobile device 102 can include cellular telephones, mobile telephones, laptop computers, personal digital assistants, and other devices that are able to communicate wirelessly. The mobile devices 102 may communicate according to the 802.11 protocol. Regardless, the mobile devices 102 are able to communicate with access points 104a, 104b, 104c, and/or 104d. In some embodiments, the mobile device 102 may be able to communicate voice data, video data, and/or other data. Regardless, the mobile device 102 can be any hardware, software, or hardware and software that may be operable to complete the functions described herein. The mobile device 102 may be a computer system, as described in conjunction with FIGS. 8 and 9.

A wireless access point 104, hereinafter referred to as an access point, can be any device that provides wireless communication to a mobile device 102. The wireless access point 104 can have one or more radios that can communicate with mobile devices 102. As such, the description that follows can apply to one or more radios at one or more access points 104. In other words, admissions and load balancing can be specific to a radio or and access point with one or more radios. Radios may collect utilization information individually, such that, each access point 104 provides two or more sets of utilization information.

In the communication system 100, an access point 104 is any device that allows mobile devices 102 to connect to a network using 802.11 Wi-Fi, Bluetooth, or related standards. The access points 104 may be connected or in communication with the control server 106 through a wired network or may relate data through one or more other wireless devices to the control server 106. The access points 104 can include any hardware, software, or hardware and software that are operable to complete the functions explained herein. Access points 104 may be computer systems as described in FIGS. 8 and 9. An example of an access point 104 may be the Linksys WAP54G 802.11 G Wireless access point. There are other examples of access points 104 that may be available. The access points 104 can receive communications or be in communication with mobile devices 102, relay information to the control server 106, or send data over a network 108. The data received by the access point 104 can be video, voice, or other data. An embodiment of an access point 104 is described in conjunction with FIG. 2.

The control server 106 can be any hardware, software, or hardware and software that is operable to control the admission of a communication session from a mobile device 102 to an access point 104. The control server 106 can be a computer system, as described in FIGS. 8 and 9. An example of a control server 106 is described in conjunction with FIG. 2. The control server 106 can receive information or data from access points 104 to determine the admission of a communication session from a mobile device 102. A communication session may be any exchange of data including voice calls. If a mobile device 102 is requesting bandwidth, the control server 106 may receive data or information from the mobile device 102, an access point 104, and a network 108. Thus, the control server 106 can functionally enable telephone calls, Internet sessions, or other types of communication sessions from a mobile device 102 to another party over the access point 104 through the network 108.

Figure 2:
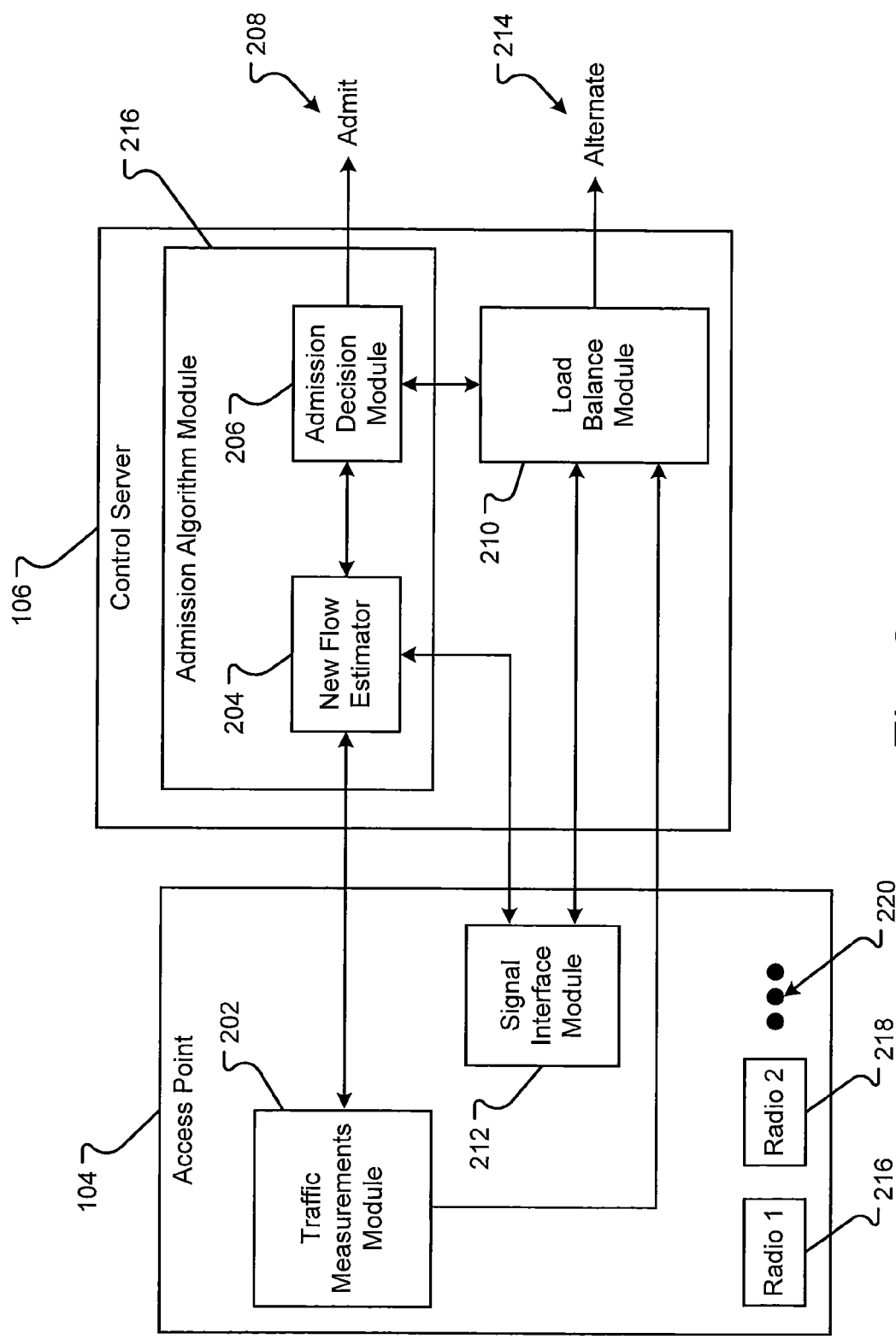
FIG. 2 is a block diagram of an embodiment of an access point and a control server operable to determine the admission of a communication session with an access point.

Embodiments of an access point 104 and control server 106 are shown in FIG. 2. The embodiments of the access point 104 and control server 106 may include software modules that are executed by a processor, as described in conjunction with FIGS. 8 and 9. In other embodiments, the modules or functions described in conjunction with FIG. 2 are embodied or constructed within a hardware device that is made to complete the functions, such as an application specific integrated circuit (ASIC) or field programmable gate array (FPGA). Regardless of the device or architecture of the hardware, the processor can execute the functions described herein. The access point 104, as explained above, may include one or more radios 216 and/or 218. There may be more of fewer radios than those shown in FIG. 2, as represented by ellipses 220. The radios 216, 218 function to provide wireless communications with one or more mobile devices 102.

Access point 104 can include a traffic measurements module 202 and a signal interface module 212. The traffic measurements module 202 is operable to measure the utilization of the radio frequency bandwidth of the access point 104 and/or for one or more of the radios 216, 218. The measurements may be computed on a per communication session basis. The traffic measurements module 202 may also calculate the amount of RF utilization for an access class. An access class can be a class of data as described in the 802.11 standard, such as voice, video, best-effort data, and background data. Other data can include data exchanged in an Internet session or in a file transfer. Each access class can have a predetermined bandwidth allotment. The measured and/or calculated RF utilization may be sent to a new flow estimator 204 that may be part of an admission algorithm module 216 on the control server 106.

In embodiments, the traffic measurements module 202 measures or determines how much over the air duration is being used by each access category in a given time interval and how much over the air time is available. For example, in a 1 sec interval, the traffic measurements module 202 may determine, measure, and/or calculate that 700 msec is being used for useful user traffic (because the following loads are determined: 200 msec is available for Voice frames, 200 ms for video, 100 for best effort, 100 for background, and 100 ms is idle). Further, the traffic measurements module 202 can determine that there are 100 msec (the idle time) that are not being used. These determination or calculations may be done by various algorithms, of which one embodiment of an algorithm is described hereinafter.

The signal interface module 212, of the access point 104, can receive requests for bandwidth to start a communication session for mobile devices 102. The signal interface 212 can receive the request 400 for bandwidth, including the amount of bandwidth requested, and send the information along with any traffic measurement information to the new flow estimator 204. Likewise, the decision as to whether the communication session will be admitted may be sent from the signal interface 212 to the mobile device 102. The new admission request 400 sent from the signal interface 212 may be sent concurrently or substantially simultaneously with the traffic measurement information to the new flow estimator 204. The new flow estimator 204 can take the information from the signal interface 212 and the traffic measurements to produce a new flow estimation that is a calculated amount of bandwidth that will be used by the access point 104 if the communication session is accepted. A decision about whether to admit the new communication session at the access point 104 must then be made. To make the decision, the new flow estimator 204 sends the new flow estimation to the admission decision module 206.

The admission decision module 206 can determine whether to admit a new communication session for the access point 104. The admission decision module 206 determines, at the time of the call or session arrival (or set up), whether or not a new call should be admitted into the network. A typical prerequisite for admission is that the Quality of Service (QoS) constraints can be satisfied without jeopardizing the QoS constraints of existing calls or sessions in the network. Denied calls are redirected to adjacent access points that have available bandwidth. Load balancing distributes the offered traffic load across all possible access devices (e.g., access points and/or radio modules) to substantially maximize the carried traffic load.

Generally, the admission decision module 206 compares the new flow estimation 204 with a maximum allowed bandwidth. The maximum allowed bandwidth may be set by a user or may be determined automatically by the type of access point 104. If the new bandwidth estimation is higher than the maximum allowed bandwidth, then the admission decision may be to deny the communication session or to find alternative access point 104 to conduct the communication session. If the decision is that the new bandwidth estimation is lower than the maximum allowed bandwidth, then the admission decision module 206 may send an admit signal 208 directed to the access point 104 to instruct the access point 104 to start communicating with the mobile device 102. If the admission decision module 206 decides not to admit the new communication session, information may be sent to a load balance module 210.

In one configuration, the decision admission module 206 reserves bandwidth for mobility traffic to ensure a high probability of success for handoff, meaning that the call that needs to be handed off to an adjacent access point is more likely to be provided with the needed bandwidth. Resource borrowing rules can ensure maximum likelihood of handoff completion. In one configuration, the call set up request (e.g., Session Initiation Protocol (SIP) invite) is sent after the RF resources have been negotiated successfully, via the ADDTS (Tspec) message procedure, with the admission decision and load balance modules 206 and 210.

The load balance module 210 may determine another access point 104 to conduct a communication session with the mobile device 102. The load balance module 210 is described in related U.S. application Ser. No. 12/716,180, entitled "Proactive Load Distribution for 802.11 Based Wireless LANs." As such, the load balance module 210 and signaling to and from the load balance module 210, including the alternate signal 214, are described in the related application. The load balance module 210 performs both load balancing (before session establishment) and load shifting (after session establishment). The load balance module 210 allows the access point to distribute the load among neighbor access points 104 in a network instead of blocking the incoming association or session request due to lack of resources.

Mobile devices 102 normally associate with the access point 104 that has the strongest signal to ensure maximum RF efficiency and lowest bandwidth. When there is a high traffic load within an access point 104 serving area or zone, an excessive number of mobile stations 102 will recognize the access point 104 as having the strongest signal, placing excessive demand on the access point 104. This situation can occur due to an unexpected number of mobile users entering the zone or an unexpected application load (i.e., group video conference). These events generally result in stranded bandwidth (i.e., bandwidth available at adjacent access points not being used) and less than the maximum carried network load. The load balance module 210 addresses these issues in various ways.

When, at the point of a new call session request (e.g., based on a Tspec) and during mobility handover (from one access point 104a to another 104b) and when the admission decision module 206 is not able to accept a new call session (e.g., due to changing RF conditions or other factors), control is passed to the load balance module 210 or an adjacent access point 104b that can better handle the session load. When a mobile device 102 first powers up and makes the association with an access point 104, the signaling invokes the load balance module 210 to interact with the mobile device 102 and ensure that the best access point is selected. This decision is normally effected by an algorithm that considers both RF signal strength at the mobile device 102 or each access point 104 for the mobile device 102 and the RF signal availability or available bandwidth at each access point. The access point 104 having the best combination of RF signal strength and RF signal availability is selected as the access point 104 to be associated with the mobile device 102.

The load balance module 210 can also consider session quality in the selection algorithm. Session quality variations, as determined by a low Mean Opinion Score (MOS) and other measures are reported to the load balance module 210. Once the access point 104 is selected, the load balance module 210 manages a seamless (from the user's viewpoint) handoff from the initially contacted access point 104 to the selected access point 104.

An embodiment of a utilization data structure 300 is shown in FIG. 3. The utilization data structure 300 can include one or more data segments that contain data regarding the RF utilization of an access point 104. The information included in a utilization data structure 300 can be collected or calculated by the access point 104, or, in other embodiments, may be received from the access point 104 and/or calculated by a control server 106. The utilization data structure 300 can include an access point 1 identifier segment 302, an access class 1 segment 304, and/or a utilization measurement segment 306. The utilization data structure 300 may include more or fewer data segments than those shown in FIG. 3, as represented by ellipses 308.

The access point 1 identifier segment 302 can include an identifier (ID) for an access point 104. Thus, access point 104a may have a first identifier stored in the access point 1 ID segment 302. Further, the utilization data structure 300 may include one or more other the access point identifiers with associated information. For example, access point 104b may have an access point 2 identifier stored in access point 2 identifier segment 312. Each access point 104 may then include other information associated with the access point identifier stored in the access point ID segment 302.

Each access point 104 can determine the access class or access class of information that is associated with the utilization measurement. The access class is stored in the requested access class 1 segment 304 or the access class 2 segment 310. For example, with the 802.11 wireless communication, the access classes may include video data, voice data, and other data. Thus, access class 1 segment 304 can store an access class identifier for voice data, while the access class 2 segment 310 can store an identifier for video data.

For each access class, there is a utilization measurement. The utilization measurement is stored in the utilization measurement segment 306. Utilization is a calculated measure of the RF utilization associated with both the access class and the access point 104. In embodiments, the utilization calculation is determined by taking the quotient of the frames size of a communication session divided by the physical layer frame transmission rate, summing each of those quotients for all the active communication sessions (or communication sessions in progress) for an access class and adding frame overhead. Overhead may be everything aside from the actual data which is sent at the data PHY rate needed to transmit a frame. Overhead can include a preamble and a header (which precedes every frame), a short Acknowledgement frame sent back from the receiver, and short pauses known as Interface spaces that must be inserted between each frame. Each of these "frame air times" is summed together for all active communication sessions on the access point 104. The sum is then divided by the measurement time. That quotient is equal to the RF utilization for that access class. The quotient is stored in the utilization measurement segment 306. The access point 104 can then generate utilizations for each of the access classes. All this information may then be stored in the utilization data structure 300 and sent to the control server 106. Further access points 104 may make the same calculations that send the utilization information to control server 106. There may be more or fewer access points 104 sending utilization data structures 300 to the control server 106, as represented by ellipses 314. The utilization information may be used by the control server 106 to determine whether or not to admit a new call or new communication session at an access point 104.

A request 400 for a new communication session or call is shown in FIG. 4. The request 400 may include one or more data segments where each data segment may store an item of data. The data segments may be associated with the new communication session request 400 can include a requested access point identifier segment 402, a requested access class segment 404, a utilization segment 406, and/or a transmission specification segment 408. The access point ID segment 402 can be the same or similar to access point ID segment 302. Likewise, the requested access class segment 404 may be the same or similar to access class 304, while the utilization segment 406 may the same or similar to utilization measurement segment 306. The data stored within these different segments, 402, 404, and/or 406 may the same or similar to the data stored in segments 302, 304, and/or 306. As such, the segments 402, 404, and/or 406 shall not be explained further.

The transmission specification segment 408 can store information received from a mobile device 102 and a request 400 for a new communication session from an access point 104. The transmission specification can include what type of access class the mobile device 102 wishes to communicate. For example, the mobile device 102 may request a voice call through the wireless access point 104. As such, the access class may be for voice data. Further, the transmission specification can also include how much bandwidth is requested. The information from the mobile device 102 may be stored in the transmission specification segment 408 and then the new communication session request 400 can be sent to the control server 106.

Figure 5:
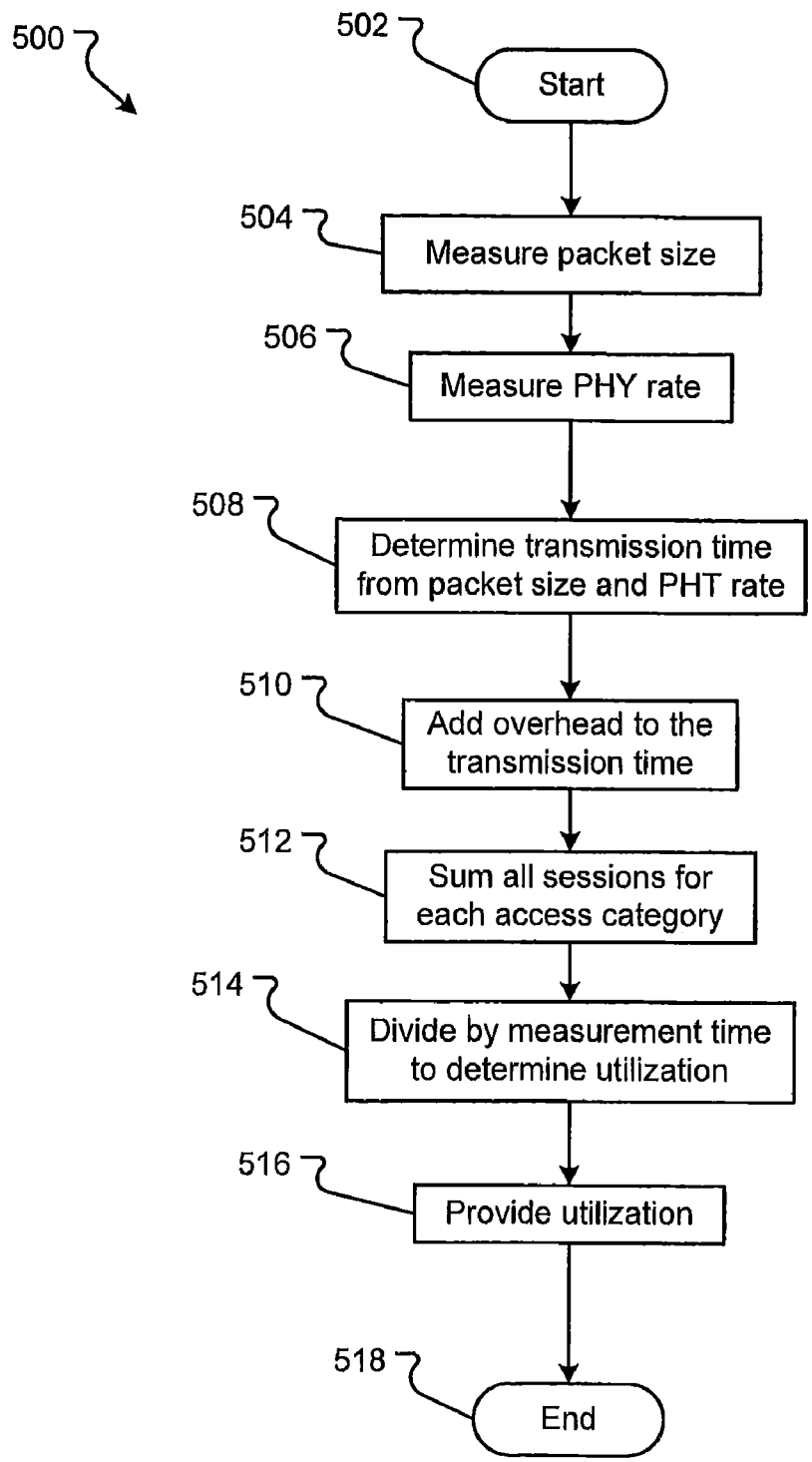
FIG. 5 is a flow diagram of an embodiment a process for determining utilization at an access point.

An embodiment of a method 500 for measuring and calculating radio frequency utilization is shown in FIG. 5. Generally, the method 500 begins with a start operation 502 and terminates with an end operation 518. While a general order for the steps of the method 500 are shown in FIG. 5, the method 500 can include more or fewer steps or arrange the order of the steps differently than those shown in FIG. 5. The method 500 can be executed as a set of computer-executable instructions executed by a computer system and encoded or stored on a computer readable medium. Hereinafter, the method 500 shall be explained with reference to the systems, components, modules, software, data structures, etc. described in conjunction with FIGS. 1-4. It should be noted that the determination of utilization may be made on a per access class basis, i.e., a measure of utilization for voice, video, best effort, etc.

The traffic measurements module 202 measures the frame size, in step 504. Frame size may be standard or may be variable. In embodiments, the frame size is standard according to a communication protocol. The number of frames sent is determined if the frame size is not standard. The number of frames and the number of bits or bytes of the frame may be determined to determine the average frame size.

The traffic measurements module 202 may then measure the physical layer data transmission rate (PHY), in step 506. PHY is a measure of the number of bits per second that are transmitted or received in the physical layer of the access point 104.

From the frame size and the PHY rate, the traffic measurements module 202 may determine a transmission time, in step 508. To determine a data transmission time, the frame size is divided by the PHY rate. The quotient of this calculation is the transmission time. The traffic measurements module 202 may then add the frame overhead to the transmission time, in step 510. Frame overhead can include any control bits or other information needed in the transmission of data frames between the mobile device 102 and the access point 104.

The transmission times for one or more communication sessions for an access class are then summed by the traffic measurements module 202. Thus, for all voice, video, or data communication sessions, the traffic measurements module 202 can sum the transmission times for each of those communication sessions and on a per access class basis, in step 512. The sum is the data air time. The data air time for the access class is then divided by the measurement time to determine the RF utilization, in step 514. The traffic measurements module 202 may have set measurements periods that occur periodically. For example, the measurement period may be every one second, every five seconds, etc. The amount of time between measurement periods or the measurement time may be used to determine the RF utilization by dividing the data air time by the measurement time. The result of this computation is the radio frequency utilization. The RF utilization may then be provided by the traffic measurements module 202 to a new flow estimator 204 or admission algorithm module 216, in step 516. In other embodiments, the PHY rate, frame size, and other information may be sent to the new flow estimator 204. The new flow estimator 204 may then calculate the RF utilization.

Figure 10:
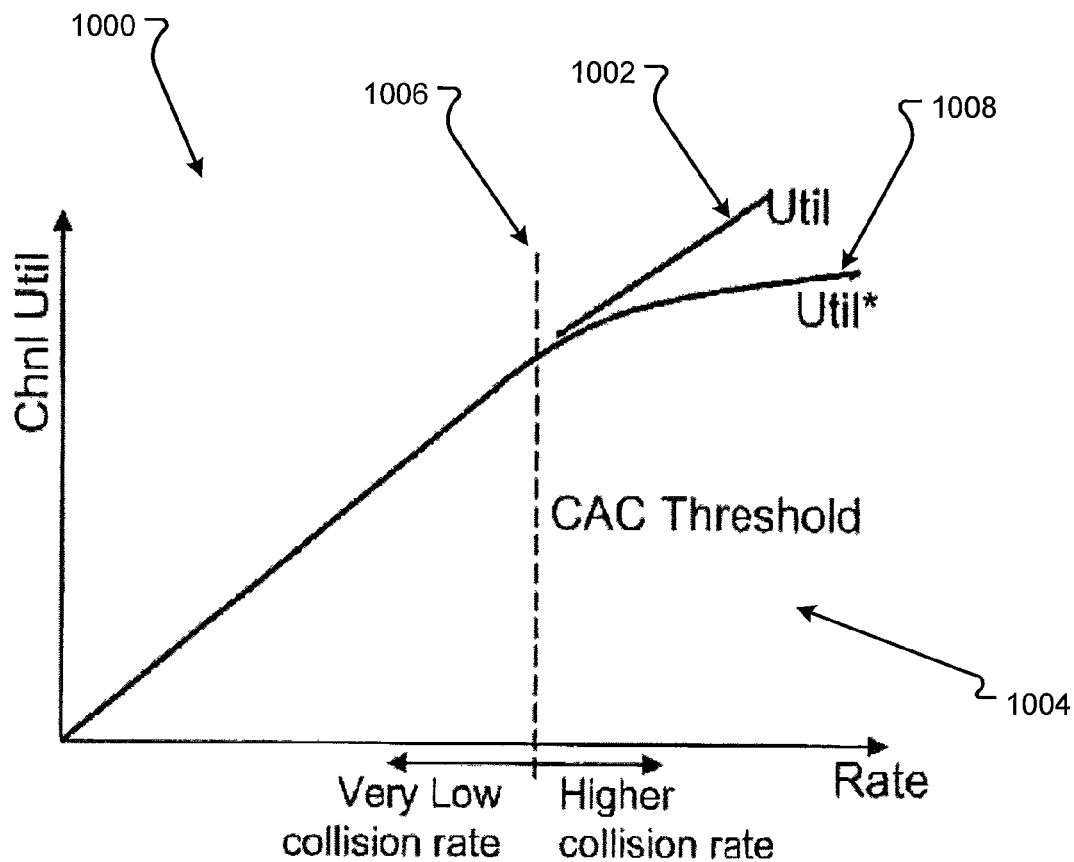
FIG. 10 is a graph showing utilization in a non-collision and collision region.

To determine channel utilization (RF utilization), the new flow estimator 204 may add the number of frames, overhead, and the amount of collisions. However, collisions are difficult to measure. Generally, once an access point 104 enters the collision region 1004 (bounded by line 1006) the effective utilization 1008 of the bandwidth lessens, as shown in the graph in FIG. 10. Here, the measure bandwidth 1008 is lower than the calculated bandwidth 1002 due to collisions. To determine actual utilization, embodiments herein use an algorithm that can effectively account for collisions and measure air time utilization.

An algorithm used to determine utilization per access class or access class is shown in the equation below.

$$\text{Utilization (per Access Class)} = \frac{\Sigma(\Sigma(\text{Frame Size}/PHY) + \text{Frame Overhead})}{\text{Measurement Period}}$$

Here, frame size is the size of the frames being transmitted. The PHY is the physical layer data transmission rate. The frame overhead is the amount of overhead per frame or for all frames being transmitted. The measurement period is the time between each measurement.

Figure 6:
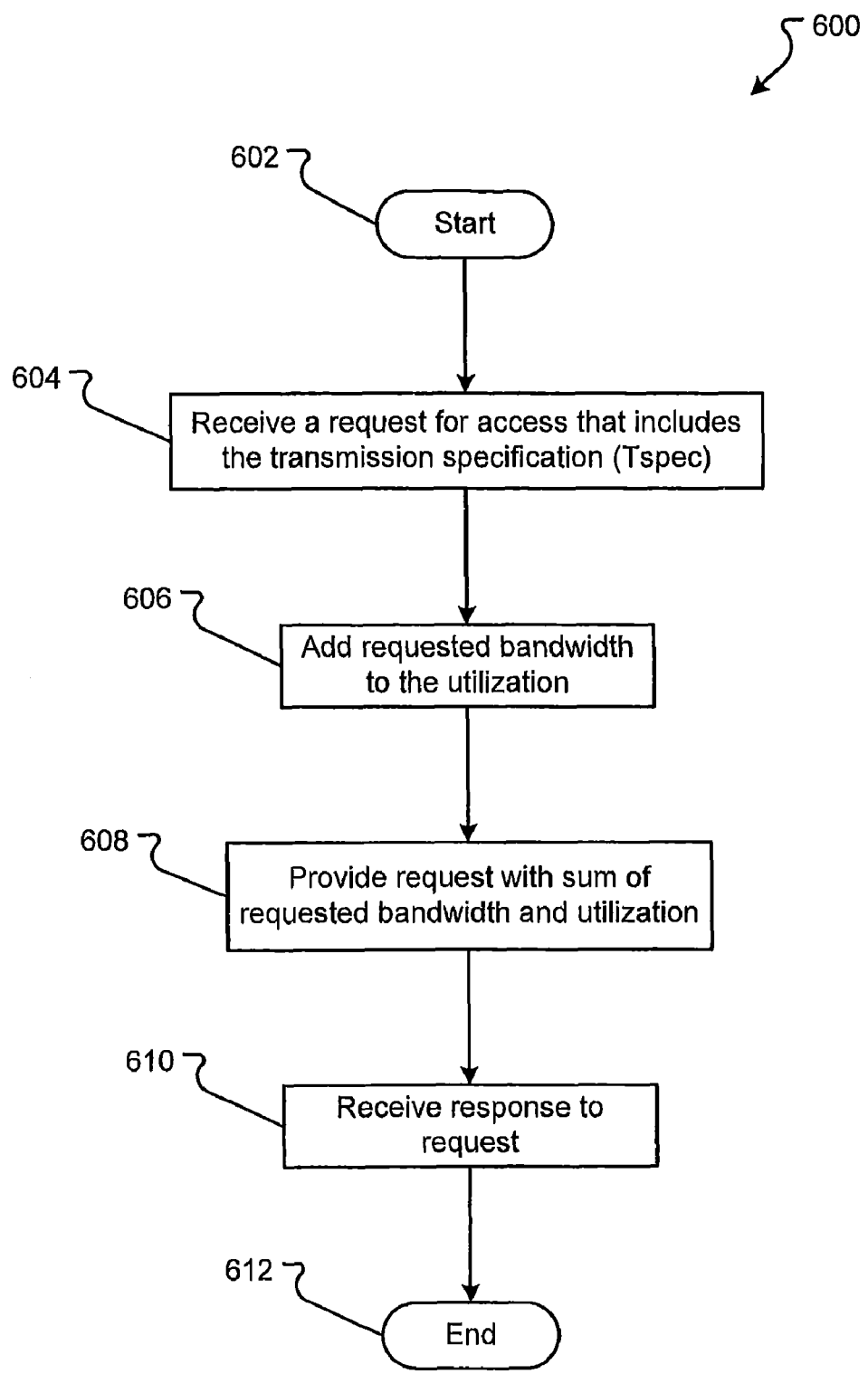
FIG. 6 is a flow diagram of an embodiment a process for sending a new communication session request to a control server.

An embodiment of a method 600 for requesting a new communication session is shown in FIG. 6. Method 600 is from the perspective of the access point 104. Generally, the method 600 begins with a start operation 602 and terminates with an end operation 612. While a general order for the steps of the method 600 are shown in FIG. 6, the method 600 can include more or fewer steps or arrange the order of the steps differently than those shown in FIG. 6. The method 600 can be executed as a set of computer-executable instructions executed by a computer system and encoded or stored on a computer readable medium. Hereinafter, the method 600 shall be explained with reference to the systems, components, modules, software, data structures, etc. described in conjunction with FIGS. 1-4.

An access point 104 can receive, from the access point 104, a request for access that includes an Add Traffic Stream (ADDTS) frame with a Traffic Specification (Tspec), in step 604. Tspec permits calls with different traffic requirements to be considered, enables mobile device 102 handoffs, such as for load balancing, and provides the resource requirements for the call. A mobile device 102 can send a request 400 for access to an access point 104. The request 400 can include a transmission specification from the mobile device 102. A transmission specification 408 is described in conjunction with FIG. 4. The Tspec can include an access class, such as video or voice data, and can include an amount of bandwidth requested for the communication session. The signal interface 212 can receive the request 400 for the bandwidth from the mobile device 102. The signal interface 212 may send the request 400 with the transmission specification to the new flow estimator 204 of the control server 106. Along with the request 400 for access and bandwidth, the access point 104 may send traffic measurement information from the traffic measurements module 202. This traffic measurement information may include the utilized bandwidth.

New flow estimator 204 can add the requested bandwidth to the current RF utilization, in step 606. To accomplish the addition, the new flow estimator 204 receives the RF utilization information from the traffic measurements module 202 and adds the requested bandwidth as received from the signal interface 212. The sum of the requested bandwidth and the RF utilization is then sent to the admission decision module 206, in step 608. In embodiments, the signal interface 212 may add the requested bandwidth to utilization measured from the traffic measurements module 202. The signal interface 212 may then send the sum of the requested bandwidth and RF utilization to the new flow estimator 204. Generally, admission decision module 206 can decide to admit or reject the call at the access point 104a that received the request based on all the load information and other information. If the call is rejected at access point 104a, the load balance module 210 can assemble a prioritized list of alternative access points 104b-d based again on the load information of the access points 104b-d and recommend the alternative access points 104b-d to the mobile device 102.

After admission decision is made, the response to the request 400 is sent from the control server 106 back to the access point 104. The access point 104 receives the response to the request 400, in step 610. The response may be a signal to admit the communication session for the mobile device 102, as determined by the admit signal 208. In other situations, the signal may be a denial of the admission for bandwidth or may be a signal directing the access point 104 to send information to the mobile device 102 to access the network 108 through a different or alternate access point 104.

In one configuration, when adequate resources are available for the call and/or the call category, the admission decision module 206 admits the call and, when inadequate resources are available for the call and/or the call access category, the admission decision module 206 does not admit the call. In the latter case, the admission decision module 206 can, if permitted by fairness policies and/or rules, borrow and subsequently return available bandwidth from other access categories. Resource sharing among access categories can be a powerful capability to maximize system capacity while ensuring high quality for the session admission decision module-accepted call session. For example, resources from voice, video, and data access categories can be shared for mass call events (or the receipt of multiple call sessions between measurement intervals or mobility handovers). In the example, a predetermined percentage of resource (e.g., channel bandwidth) for each category is designated as being subject to sharing with other access categories. Alternatively, the call can be handed off, by the load balance module 210, to adjacent radio modules or access points 104.

Figure 7:
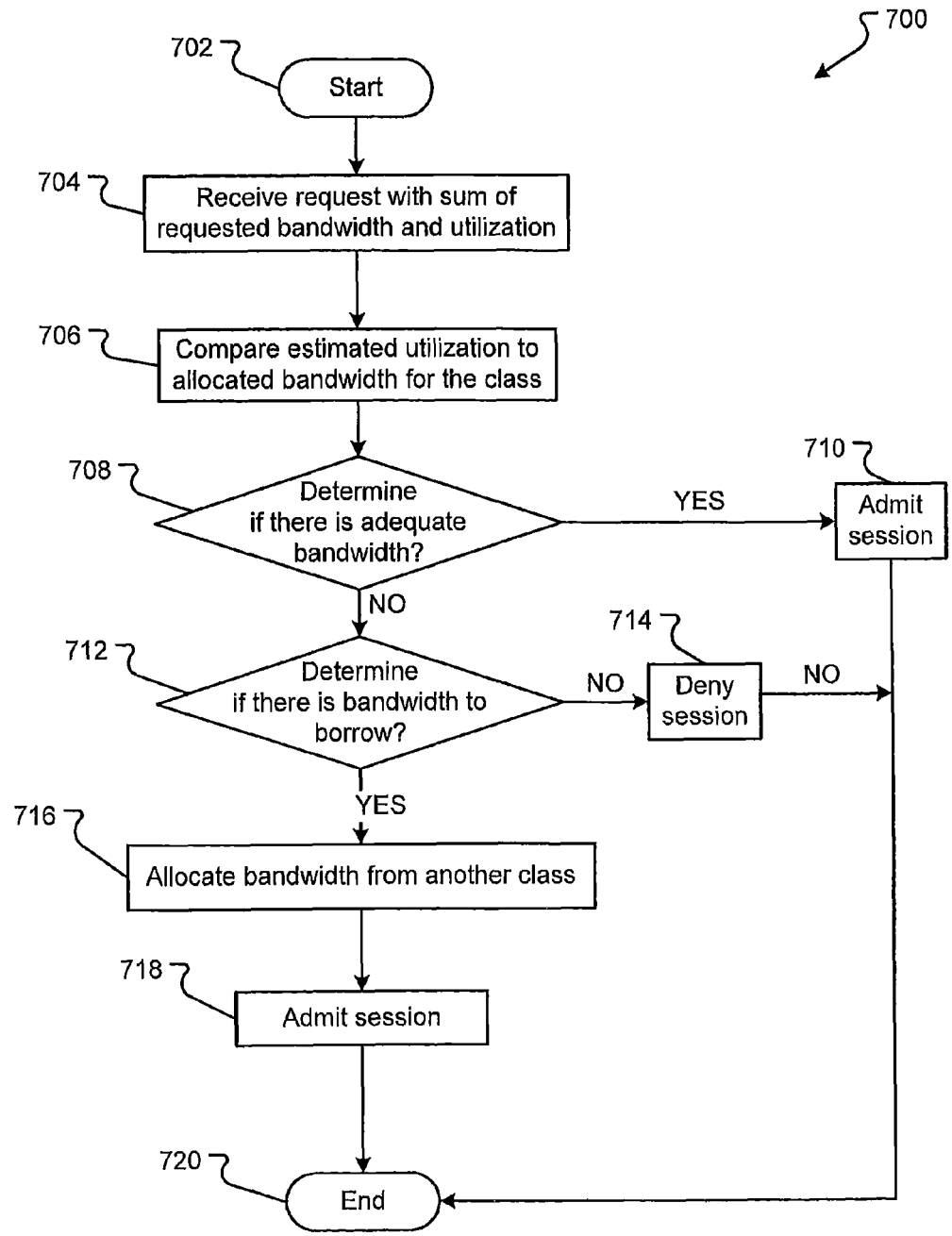
FIG. 7 is a flow diagram of an embodiment a process for determining whether to admit a new communication session at an access point.

An embodiment of a method 700 for processing a response to a message from the social media network site is shown in FIG. 7. Generally, the method 700 begins with a start operation 702 and terminates with an end operation 720. While a general order for the steps of the method 700 are shown in FIG. 7, the method 700 can include more or fewer steps or arrange the order of the steps differently than those shown in FIG. 7. The method 700 can be executed as a set of computer-executable instructions executed by a computer system and encoded or stored on a computer readable medium. Hereinafter, the method 700 shall be explained with reference to the systems, components, modules, software, data structures, etc. described in conjunction with FIGS. 1-4.

A new flow estimator 204 can receive a request 400 for new bandwidth that includes the sum of the requested bandwidth with the RF utilization from the signal interface 212, in step 704. In other embodiments, the admission decision module 206 receives the request 400, with the sum of the requested bandwidth plus the RF utilization from the new flow estimator 204. The admission decision module 206 can compare the amount of bandwidth available with the amount in the sum of the requested bandwidth plus RF utilization, in step 706. This comparison attempts to compare the amount of bandwidth required to provide the new communication session to a threshold level of RF utilization. The threshold level of RF utilization may be determined by setting a threshold below the collision region for the access point 104. A collision region is a level of received data traffic that begins to collide or cause interference between different users at the access point 104. The collision region is generally determined by the frequency of data travel and can be determined by someone skilled in the art. Thus, the request 400 for new bandwidth received by the access point 104 can be used to determine if the request 400 will put the amount of RF utilization within the collision region. In this way, the admission decision module 206 determines if there is adequate bandwidth, in step 708. Thus, if the requested bandwidth does not put the amount of bandwidth within the collision region, there is adequate bandwidth, then step 708 proceeds "YES" to step 710. If there is not adequate bandwidth, step 708 proceeds "NO" to step 712. The determination for adequate bandwidth is generally made on an access class basis. Therefore, each class of data, whether voice, video, or other data, has its own bandwidth limits. Voice and video data are communications not allowed to enter the collision region. Other data may be sent in the collision region because the other data may not be as time sensitive as video or voice data. As such, the determination for adequate bandwidth can be made on an access class basis.

If there is adequate bandwidth, the admission decision module 206 admits the communication session, in step 710. By admitting the communication session, the admission decision module 206 sends admit signal 208 to the access point 104, which directs the signal interface 212 to admit the communication session with the mobile device 102. However, if there is not adequate bandwidth for the access class, the admission decision module 206 then determines if there is available bandwidth to borrow from a different access class, in step 712. For example, the admission decision module 206 may determine that there is not adequate bandwidth in the voice access class, but there may be there spare bandwidth within the video access class. If there is spare bandwidth in another access class, the admission decisions module 206 may determine that there is bandwidth to borrow. If there is bandwidth to borrow, step 712, proceeds "YES" to step 716. If there is no bandwidth to borrow, step 712 proceeds "NO" to step 714.

In step 714, the admission decision module 206 denies the communication session. To deny the communication session, the admission decision module 206 may send a deny signal to the access point 104, which directs the signal interface 212 to deny access to the mobile device 102. However, if there is bandwidth to borrow, the admission decision module 206 may allocate bandwidth from another access class to the communication session for a temporary basis, in step 716. For example, the admission decision module 206 may assign the bandwidth required for the communication session from a different access class and may set a timer for how long it is possible to use this bandwidth. As other communications sessions are dropped, the communication session with borrowed bandwidth may begin to use the bandwidth in the correct access class over time. As such, the communication session is allowed and the access point 104 is utilized at a higher capacity without causing communication interference or problems with other mobile devices 102. Thus, if there is adequate bandwidth to borrow, the admission decision module 206 sends the admit signal 208 to admit the communication session, in step 718. The admit signal 208 sent under step 718, may include the information about the borrowed bandwidth, such that the access point 104 can modify its settings to allow the communication session.

After admitting the communication session in steps 710 or 718, the RF utilization for an access point 104 may be artificially set to 100%. This artificial setting may automatically degrade to the measured RF utilization over a predetermined period of time, which may be set by the user. As such, the admissions decision module 206 can prevent accepting too many communication sessions between measurement periods and over utilizing the access point 104.

The embodiments presented herein provide distinct advantages over the present art. The present art typically only allows access based on the signal strength of the access points 104. Thus, present prior art systems do not determine the utilization at access points 104 to determine how to admit or deny communication sessions with mobile devices 102. The systems and methods presented in the present application determine the RF utilization of access points 104 based on real measurements and are able to adjust the admission of communication sessions from mobile devices 102 based on the measured and calculated RF utilization. Further, the systems are operable to borrow bandwidth from other access classes in order to maximize the communications through any one access point 104.

In alternative embodiments, the admission decision module 206 and/or access point 104 may assign bandwidth for inter-access point communications. For example, a certain amount of bandwidth may be reserved, such that if a mobile device 102 moves from a first access point 104 to the region of access point 104b, the communication session may be transferred between access point 104a to access point 104b without dropping the communication because access point 104b reserves bandwidth for the transfer. Thus, this makes for better overall network administration and function. This reservation of bandwidth also facilitates the proactive load balancing that the system can complete during high load conditions.

In further alternative embodiments, there may be bandwidth reserved for emergency communications. Thus, the wireless network can receive and administer emergency calls without harming other communications that are already in session. Thus, the wireless system is available at any time for emergency situations.

In still another alternative embodiment, if a communication session is admitted to the access point, the RF utilization for the access point can be deemed, by the access point or the admission decision module 206 to be full (i.e., at 100% capacity). The RF utilization may then attenuate or decrease to the measured RF utilization over a predetermined period of time. The predetermined period of time can be set by the user or be a standard period of time, e.g., 5 seconds. This process prevents overloading an access point by mass call events between measurement periods for determining actual RF utilization. As such, the access point appears fully loaded after admitting each call until a next measured RF utilization is determined. No calls will be admitted during the period between admitting the new call and measuring the RF utilization.

The advantages of the embodiments presented herein are numerous. The system bases admissions decision on utilization rather than simply on signal strength. As such, access points can be better utilized and highly utilized access points can shift load. The system, in a high load condition, can find admission solutions (i.e., match up mobile devices with access points) that maximizes the total wireless network system throughput and capacity. Some individual mobile devices may be pushed to access points that are farther away and get lower signal quality, but, overall, across all mobile devices accessing the wireless network, the total capacity is increased. As such, the wireless network performs better and more efficiently.

Figure 8:
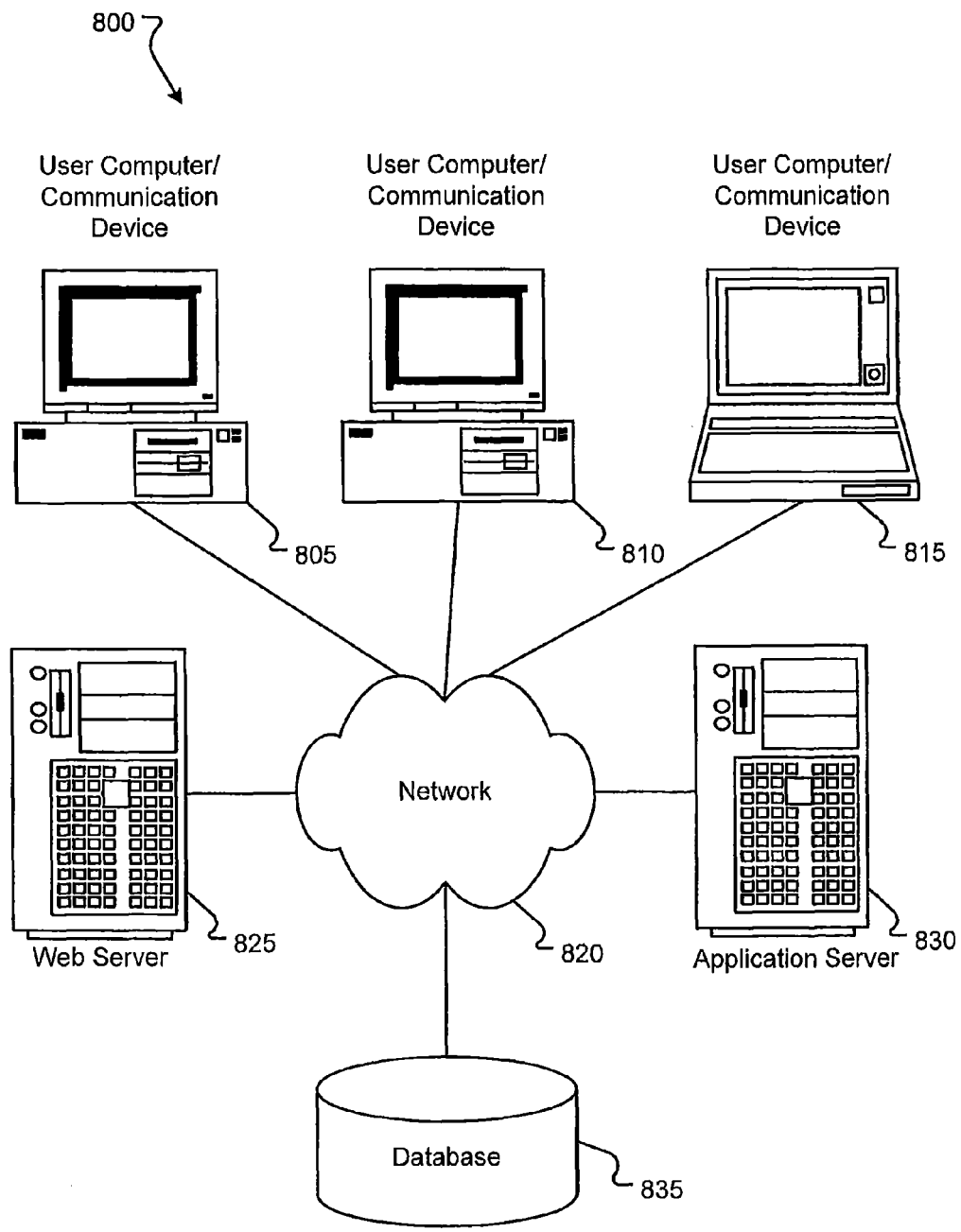
FIG. 8 is a block diagram of an embodiment of a computing environment.

FIG. 8 illustrates a block diagram of a computing environment 800 that may function as servers, computers, or other systems provided herein. The environment 800 includes one or more user computers 805, 810, and 815. The user computers 805, 810, and 815 may be general purpose personal computers (including, merely by way of example, personal computers, and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 805, 810, 815 may also have any of a variety of applications, including for example, database client and/or server applications, and web browser applications. Alternatively, the user computers 805, 810, and 815 may be any other electronic device, such as a thin-client computer, Internet-enabled mobile telephone, and/or personal digital assistant, capable of communicating via a network 820 and/or displaying and navigating web pages or other types of electronic documents. Although the exemplary computer environment 800 is shown with three user computers, any number of user computers may be supported.

Environment 800 further includes a network 820. The network 820 may can be any type of network familiar to those skilled in the art that can support data communications using any of a variety of commercially-available protocols, including without limitation SIP, TCP/IP, SNA, IPX, AppleTalk, and the like. Merely by way of example, the network 820 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 602.11 suite of protocols, the Bluetooth™ protocol known in the art, and/or any other wireless protocol); and/or any combination of these and/or other networks. The network 820 may be the same or similar to network 109.

The system may also include one or more server 825, 830. In this example, server 825 is shown as a web server and server 830 is shown as an application server. The web server 825, which may be used to process requests 400 for web pages or other electronic documents from user computers 805, 810, and 815. The web server 825 can be running an operating system including any of those discussed above, as well as any commercially-available server operating systems. The web server 825 can also run a variety of server applications, including SIP servers, HTTP servers, FTP servers, CGI servers, database servers, Java servers, and the like. In some instances, the web server 825 may publish operations available operations as one or more web services.

The environment 800 may also include one or more file and or/application servers 830, which can, in addition to an operating system, include one or more applications accessible by a client running on one or more of the user computers 805, 810, 815. The server(s) 830 and/or 825 may be one or more general purpose computers capable of executing programs or scripts in response to the user computers 805, 810 and 815. As one example, the server 830, 825 may execute one or more web applications. The web application may be implemented as one or more scripts or programs written in any programming language, such as Java™, C, C#™, or C++, and/or any scripting language, such as Perl, Python, or TCL, as well as combinations of any programming/scripting languages. The application server(s) 830 may also include database servers, including without limitation those commercially available from Oracle, Microsoft, Sybase™, IBM™ and the like, which can process requests 400 from database clients running on a user computer 805.

The web pages created by the server 825 and/or 830 may be forwarded to a user computer 805 via a web (file) server 825, 830. Similarly, the web server 825 may be able to receive web page requests, web services invocations, and/or input data from a user computer 805 and can forward the web page requests and/or input data to the web (application) server 830. In further embodiments, the web server 830 may function as a file server. Although for ease of description, FIG. 8 illustrates a separate web server 825 and file/application server 830, those skilled in the art will recognize that the functions described with respect to servers 825, 830 may be performed by a single server and/or a plurality of specialized servers, depending on implementation-specific needs and parameters. The computer systems 805, 810, and 815, web (file) server 825 and/or web (application) server 830 may function as the system, devices, or components described in FIGS. 1-2.

The environment 800 may also include a database 835. The database 835 may reside in a variety of locations. By way of example, database 835 may reside on a storage medium local to (and/or resident in) one or more of the computers 805, 810, 815, 825, 830. Alternatively, it may be remote from any or all of the computers 805, 810, 815, 825, 830, and in communication (e.g., via the network 820) with one or more of these. The database 835 may reside in a storage-area network ("SAN") familiar to those skilled in the art. Similarly, any necessary files for performing the functions attributed to the computers 805, 810, 815, 825, 830 may be stored locally on the respective computer and/or remotely, as appropriate. The database 835 may be a relational database, such as Oracle 101™, that is adapted to store, update, and retrieve data in response to SQL-formatted commands.

Figure 9:
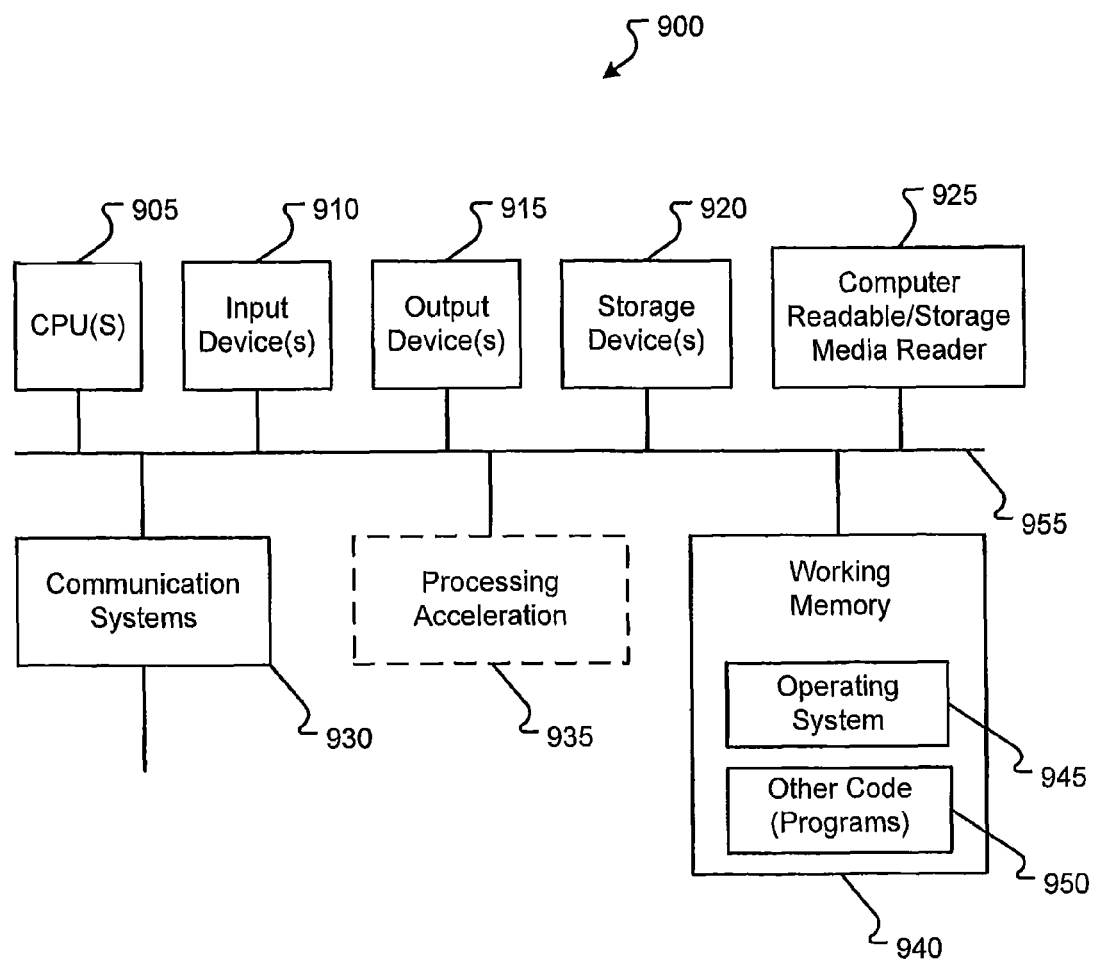
FIG. 9 is a block diagram of an embodiment of a computer system.

FIG. 9 illustrates one embodiment of a computer system 900 upon which the servers, computers, or other systems or components described herein may be deployed or executed. The computer system 900 is shown comprising hardware elements that may be electrically coupled via a bus 955. The hardware elements may include one or more central processing units (CPUs) 905; one or more input devices 910 (e.g., a mouse, a keyboard, etc.); and one or more output devices 915 (e.g., a display device, a printer, etc.). The computer system 900 may also include one or more storage devices 920. By way of example, storage device(s) 920 may be disk drives, optical storage devices, solid-state storage devices such as a random access memory ("RAM") and/or a read-only memory ("ROM"), which can be programmable, flash-updateable and/or the like.

The computer system 900 may additionally include a computer-readable storage media reader 925; a communications system 930 (e.g., a modem, a network card (wireless or wired), an infra-red communication device, etc.); and working memory 940, which may include RAM and ROM devices as described above. The computer system 900 may also include a processing acceleration unit 935, which can include a DSP, a special-purpose processor, and/or the like.

The computer-readable storage media reader 925 can further be connected to a computer-readable storage medium, together (and, optionally, in combination with storage device(s) 920) comprehensively representing remote, local, fixed, and/or removable storage devices plus storage media for temporarily and/or more permanently containing computer-readable information. The communications system 930 may permit data to be exchanged with the network 820 (FIG. 8) and/or any other computer described above with respect to the computer system 900. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 900 may also comprise software elements, shown as being currently located within a working memory 940, including an operating system 945 and/or other code 950. It should be appreciated that alternate embodiments of a computer system 900 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments have been described in detail herein, it is to be understood that the inventive concepts may be otherwise variously embodied and employed, and that the appended claims are intended to be construed to include such variations, except as limited by the prior art.

What is claimed is:

1. A method for determining whether to admit a new communication session at a wireless access point, the method comprising:

a processor measuring an over-the-air utilization at the wireless access point, wherein the over-the-air utilization is measured by a radio frequency (RF) utilization for one or more radios associated with the wireless access point and wherein the wireless access point measures the RF utilization, wherein measuring radio frequency (RF) utilization comprises:

the processor measuring a data rate (PHY) for one or more frames, wherein PHY is a measurement of the data rate for a physical layer of the wireless access point;

based on a frame size and the PHY, the processor determining a transmission time for the one or more frames, wherein the transmission time is determined by dividing the frame size by the PHY;

the processor adding overhead time to the transmission time;

the processor summing the overhead and transmission times for at least two associated communication sessions to determine the data air time; and the processor dividing the data air time by an elapsed time to determine the RF utilization;

the processor receiving a request for the new communication session;

the processor determining an amount of bandwidth based on the measured over-the-air utilization and an amount of bandwidth requested for the new communication session;

based on the bandwidth for the measured over-the-air utilization and the bandwidth requested for the new communication session, the processor determining whether to admit the new communication session; and if there is sufficient available bandwidth for the new communication session, the processor admitting the new communication session at the wireless access point.

2. The method as defined in claim 1, wherein the data air time is for an access class.

3. The method as defined in claim 2, wherein there is two or more access classes each with a different data air time.

4. The method as defined in claim 2, wherein the access class includes at least two of a group comprising video, voice, and data.

5. The method as defined in claim 2, wherein the access class has a predetermined bandwidth allotment.

6. A non-transitory computer readable medium, stored on a tangible medium, having stored thereon instructions that cause a computing system to execute a method for determining whether to admit a communication session at a wireless access point, the instructions comprising:

instructions to receive a summation of a measured radio frequency (RF) utilization and a requested bandwidth for a requested communication session between the wireless access point and a mobile device;

instructions to compare the summation to an allocated bandwidth, wherein the allocated bandwidth is allocated for an access class;

if the summation is more than the allocated bandwidth, instructions to deny the requested communication session; and if the summation is less than the allocated bandwidth, instructions to admit the requested communication session, wherein the requested communication session is for a requested access class and wherein the comparison of the summation to the allocated bandwidth is for the requested access class, the instructions further comprising:

instructions to determine if there is bandwidth to borrow from a second access class;

if there is bandwidth to borrow from a second access class, allocate the borrowed bandwidth to the requested communication and admit the requested communication session; and if there is no bandwidth to borrow from a second access class, deny the requested communication session.

7. The computer readable medium as defined in claim 6, wherein the borrowed bandwidth is borrowed for a limited time.

8. The computer readable medium as defined in claim 6, further comprising instructions to reserve bandwidth for inter-access point transfers of communication sessions, wherein the reserved bandwidth is part of the summation.

9. The computer readable medium as defined in claim 6, further comprising instructions to reserve bandwidth for emergency communication sessions, wherein the reserved bandwidth is part of the summation.

10. A communication system comprising:

two or more wireless access points, the two or more wireless access points configured to measure an over-the-air utilization that is measured by a radio frequency (RF) utilization for one or more radios associated with the two or more wireless access points, and configured to receive a request for a communication session from a mobile device; and a control server in communication with the two or more wireless access points, the control server configured to receive the RF utilization and the request for the communication session and configured to determine from the RF utilization and the request for the communication session whether the requested communication session should be admitted by one of the two or more access points, wherein the control server comprises:

a new flow estimator configured to determine a new bandwidth amount that will be used if the requested communication session is admitted; and an admission decision module in communication with the new flow estimator, the admission decision module configured to compare the new bandwidth amount to an allotment of bandwidth and configured, based on the comparison, to send an admit signal to one of the wireless access points to admit the requested communication session.

11. The communication system as defined in claim 10, wherein each of the two or more access points comprise:

a traffic measurements module configured to measure the RF utilization; and a signal interface module configured to receive the request for the communication session.

12. The communication system as defined in claim 10, wherein the new bandwidth amount is determined by adding the measured RF utilization from the traffic measurements module with a requested bandwidth received from the mobile device by the signal interface.

13. The communication system as defined in claim 10, wherein, if the communication session is admitted, the RF utilization is deemed to be full and the RF utilization is attenuated to the measured RF utilization over a predetermined period of time.

14. The communication system as defined in claim 13, wherein the admission decision module is configured to allot borrowed bandwidth from a second access class to the communication session and is configured to admit the communication session with the borrowed bandwidth.

* * * * *

UNITED STATES PATENT AND TRADEMARK OFFICE
CERTIFICATE OF CORRECTION

| | | |
|---|---|---|
| PATENT NO. | : 8,385,197 B2 | Page 1 of 1 |
| APPLICATION NO. | : 12/716168 | |
| DATED | : February 26, 2013 | |
| INVENTOR(S) | : Marvin Krym et al. | |

It is certified that error appears in the above-identified patent and that said Letters Patent is hereby corrected as shown below:

On the Title page:

In item (75), line 4, please delete "Liu" and insert --Lu-- therefor.

Signed and Sealed this
Fourth Day of June, 2013

Teresa Stanek Rea
*Acting Director of the United States Patent and Trademark Office*